(12) United States Patent
Salomon et al.

(10) Patent No.: US 9,619,905 B2
(45) Date of Patent: Apr. 11, 2017

(54) APPARATUS AND METHOD FOR GENERATION OF ATTENUATION MAP

(75) Inventors: Andre Salomon, Bergisch Gladbach (DE); Andreas Goedicke, Aachen (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 1297 days.

(21) Appl. No.: 12/864,246

(22) PCT Filed: Oct. 29, 2008

(86) PCT No.: PCT/IB2008/054501
§ 371 (c)(1),
(2), (4) Date: Jul. 23, 2010

(87) PCT Pub. No.: WO2009/060351
PCT Pub. Date: May 14, 2009

(65) Prior Publication Data
US 2011/0007958 A1    Jan. 13, 2011

Related U.S. Application Data

(60) Provisional application No. 60/986,691, filed on Nov. 9, 2007, provisional application No. 61/042,794, filed on Apr. 7, 2008.

(51) Int. Cl.
G06K 9/00    (2006.01)
G06T 11/00   (2006.01)
(Continued)

(52) U.S. Cl.
CPC ............ *G06T 11/005* (2013.01); *G06T 7/11* (2017.01); *G06T 7/149* (2017.01);
(Continued)

(58) Field of Classification Search
CPC ...................................................... G06T 11/005
See application file for complete search history.

(56) References Cited

U.S. PATENT DOCUMENTS 4,686,695 A * 8/1987 Macovski .............. A61B 6/032
                                                 348/E5.089
5,982,845 A   11/1999 Sidoti et al.
(Continued)

FOREIGN PATENT DOCUMENTS

EP          1006370 A2      6/2000
WO     WO 2006055498 A2 *  5/2006

OTHER PUBLICATIONS

Frey et al., "A New Method for Modeling the Spatially-Variant, Object-Dependent Scatter Response Function in SPECT", Nuclear Science Symposium 1996 Conference Record. 1996 IEEE, vol. 2, pp. 1082-1086.
(Continued)

*Primary Examiner* — Robert A Sorey

(57) ABSTRACT

A method of image reconstruction corrected for attenuation is provided for use with radioemission-based imaging, such as SPECT and PET. This method includes collecting measured emission projection data. The emission projection data, a reconstruction of the emission projection data, and a priori organ information are collectively analyzed to generate a body region estimate of the imaged subject. Each voxel of the body region estimate is then homogenously assigned an attenuation coefficient to generate an initial attenuation map estimate. An initial emission assumption is also generated based on a reconstruction of the emission projection data. The initial emission assumption and initial attenuation map estimate are then processed and refined to produce an image reconstruction.

24 Claims, 6 Drawing Sheets

Figure 1:
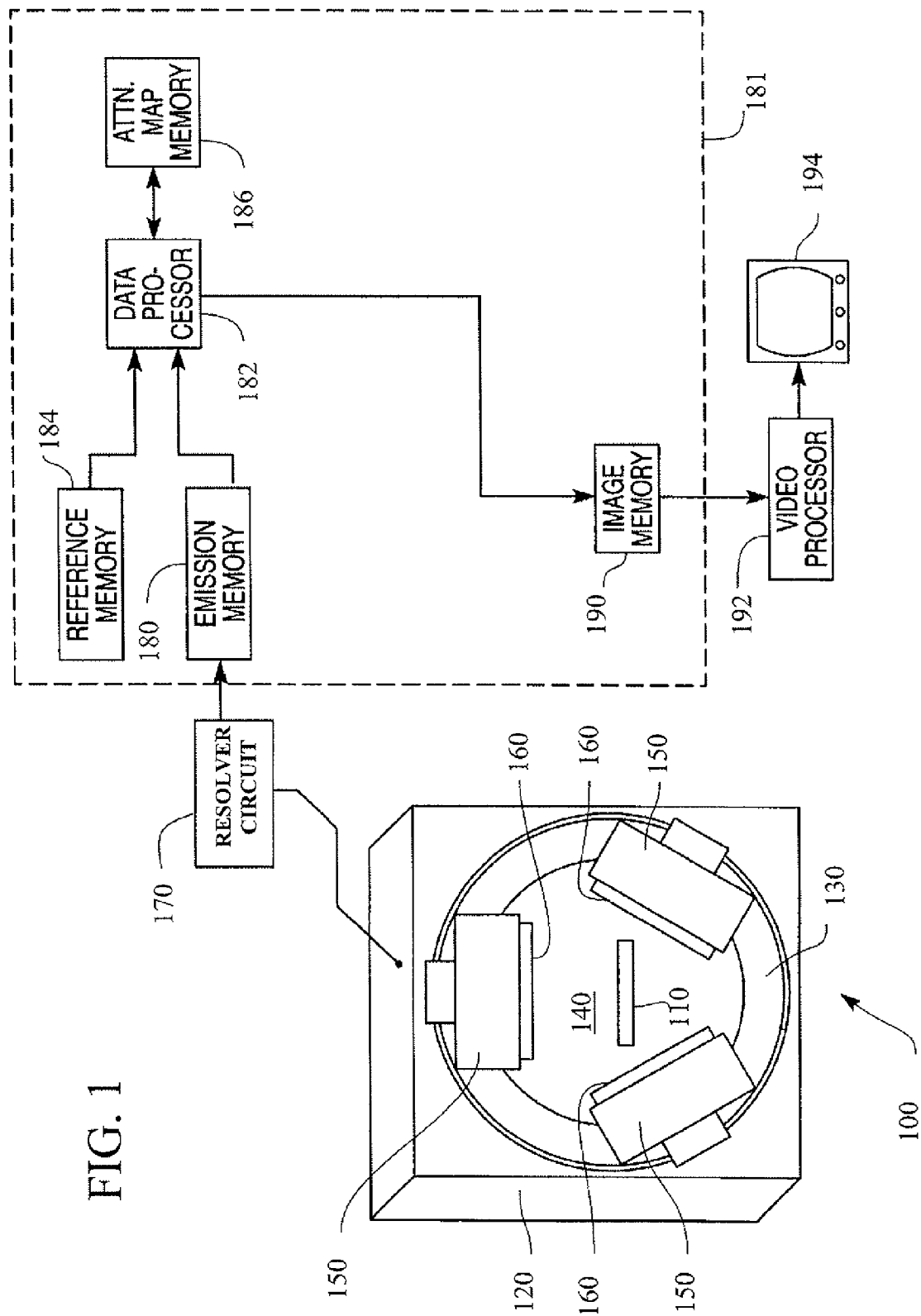

(51) Int. Cl.
G06T 7/11 (2017.01)
G06T 7/149 (2017.01)
(52) U.S. Cl.
CPC ............... G06T 2207/10104 (2013.01); G06T 2207/10108 (2013.01); G06T 2207/30004 (2013.01); G06T 2211/424 (2013.01)

(56) References Cited

U.S. PATENT DOCUMENTS

| | | | |
|---|---|---|---|
| 6,310,968 B1* | 10/2001 | Hawkins et al. | 382/131 |
| 6,787,777 B1* | 9/2004 | Gagnon et al. | 250/363.04 |
| 8,498,465 B2* | 7/2013 | Xing | G06T 11/005 382/131 |
| 2005/0152590 A1* | 7/2005 | Thieret | G06T 11/006 382/131 |
| 2006/0000983 A1 | 1/2006 | Charron et al. | |
| 2006/0072802 A1* | 4/2006 | Higgs et al. | 382/131 |
| 2006/0098857 A1 | 5/2006 | Hawman | |
| 2006/0237652 A1* | 10/2006 | Kimchy et al. | 250/363.02 |
| 2008/0073543 A1* | 3/2008 | Vija | G01T 1/1611 250/370.08 |

OTHER PUBLICATIONS

Bronnikov, "Reconstruction of Attenuation Map Using Discrete Consistency Conditions", IEEE Transactions on Medical Imaging, vol. 19, No. 5, May 2000, pp. 451-462.

Kudo et al., "A New Approach to SPECT Attenuation Correction without Transmission Measurements", Nuclear Science Symposium Conference Rcord, 2000 IEEE, 13-58-13-62, vol. 2.

Dicken, "A new approach towards simultaneous activity and attenuation reconstruction in emission tomography", Inverse Problems, 15, 1999, pp. 931-960.

Natterer, "Determination of tissue attenuation in emission tomography of optically dense media", Inverse Problems 9, 1993, pp. 731-736.

Nuyts, et al., "Simultaneous Maximum A Posteriori Reconstruction of Attenuation and Activity Distributions from Emission Sinograms", IEEE Transactions on Medical Imaging, vol. 18, No. 5, May 1999, pp. 393-403.

Krol et al., "An EM Algorithm for Estimating SPECT Emission and Transmission Parameters from Emission Data Only", IEEE Transactions on Medical Imaging, vol. 20, No. 3, Mar. 2001, pp. 218-232.

Hobbie, "Intermediate Physics for Medicine and Biology", Third Edition, pp. 333-343, copyright 1997.

Chandra, "Nuclear Medicine Physics, The Basics", Fifth Edition, pp. 130-137, copyright 1998.

Saha, "Physics and Radiobiology of Nuclear Medicine", pp. 124-129, copyright 1993.

Noumeir, R., et al.; Attenuation Correction in SPECT using Active Surfaces; 1999; IEEE Nuclear Science Symposium and Medical Imaging Conf.; vol. 3; pp. 1995-1999.

Wallis, J. W., et al.; Attenuation Correction in Cardiac SPECT without a Transmission Measurement; 1995; The Journal of Nuclear Medicine; 36(3)506-512.

Weinzapfel, B. T., et al.; Automated PET Attenuation Correction Model for Functional Brain Imaging; 2001; J. Nucl Med; 42:483-491.

King, M. A., et al.; Attenuation, Scatter, and Spatial Resolution Compensation in SPECT; 2004; Emission Tomography: The Fundamentals of SPECT and PET, Academic Press; Chapter 22: pp. 473-498.

Censor, Y., et al.; A New Approach to the Emission Computerized Topography Problem: Simultaneous Calculation of Attenuation and Activity Coefficients; 1979; IEEE Trans. Nucl. Sci.; 26:2775-2779.

* cited by examiner

APPARATUS AND METHOD FOR GENERATION OF ATTENUATION MAP

CROSS REFERENCE TO RELATED APPLICATIONS

This application claims the benefit of U.S. provisional application Ser. No. 60/986,691 filed Nov. 9, 2007 and U.S. provisional application Ser. No. 61/042,794 filed Apr. 7, 2008, both of which are incorporated herein by reference.

The present application relates generally to the imaging arts and more particularly to the generation of attenuation maps for use in electronic image reconstruction. It has application at least in single-photon emission computed tomography (SPECT) imaging without the need for an additional transmission measurement from another imaging modality, such as computed tomography (CT) or magnetic resonance (MR), or an additional transmission source, such as a line- or point-source attached to the SPECT scanner, and will be described with particular reference thereto. However, it also finds more general application in generating attenuation maps for use with other radioemission-based imaging, including, but not limited to positron emission tomography (PET), and in other arts.

Radioemission-based imaging devices, such as SPECT or PET imaging devices, include detectors that detect electromagnetic radiation emitted from radioactive isotopes, such as a radiopharmaceutical administered to a patient. The detectors typically include a sheet of scintillation crystal material that interacts with gamma rays emitted by the isotope to produce photons in the visible light spectrum known as "events."

In a conventional SPECT study, such as the study of a patient's organ, the radioisotope administered to the patient is adapted to be taken up by the particular organ or region of the body to be studied. Then, the patient is placed on an imaging bed of a SPECT system. A gamma or scintillation camera including one or more detectors is rotated about the long axis of the patient detecting gamma emissions from the patient's body at various angular orientations about the axis. The resulting data is used to form a set of multiple two-dimensional images (also called projections, projection images or sinograms). Three-dimensional SPECT images (known as SPECT images or tomographic images) of the distribution of the radioisotope within the patient can be calculated based on this set of two-dimensional images. This calculation process is known as image reconstruction.

However, a significant portion of the photons emitted from the radioisotope interact with tissue or other material between the radiation source and the detector. That interaction typically prevents some photons from reaching the detector (attenuation) and changes the direction of some photons (scatter). The degree of attenuation and scatter will vary from patient to patient and depends upon the physical characteristics of the matter (i.e., bone, muscle, organ tissue, etc.) between the emitting source and the detector. As a consequence of attenuation and scatter, quantitative data obtained from SPECT imaging devices must be appropriately processed to accurately represent the distribution of the radioisotope within a patient's body.

The attenuation and scatter of emitted radiation as it passes through the imaged subject may be accounted for during image reconstruction in a process known as attenuation correction. Attenuation correction is now an integral part of nuclear medicine image reconstruction. Toward this end, an attenuation map (μ map) of the imaged subject is advantageously provided to be used in attenuation correction during the reconstruction process (as done with the Philips Astonish software program). Many prior art techniques for attenuation correction in SPECT have assumed that the attenuation coefficient of the body is uniform. However, this is an oversimplification, as the human body is not homogenous in terms of radiation attenuation and the attenuation coefficient may vary greatly for different areas of the body due to varying mass, density, and other characteristics. Accordingly, assuming a uniform attenuation coefficient throughout the entire body often introduces errors into the image reconstruction.

A more accurate attenuation map of the imaging subject can be generated using another imaging modality, such as CT or MR imaging data acquired from the imaged subject. Such imaging data may be acquired using a radiation source arranged to transmit radiation through the subject, such as x-rays generated by an x-ray tube or radiation generated by a Gd-153 line source. The CT image produced by transmission CT projection data is indicative of the absorption of radiation transmitted through the imaging subject. Such radiation absorption is qualitatively similar to the absorption of gamma rays emitted by radiopharmaceuticals. For example, both x-rays and gamma rays are absorbed more by bone as compared with softer tissue. As a result, CT imaging data can be used to estimate an attenuation map for gamma rays emitted by the radiopharmaceutical. Similar transmission data can also be obtained by the use of dedicated external SPECT scanner hardware extensions, such as Gd line- or point-sources attached to the SPECT scanner.

The use of such additional external radiation sources (such as x-rays or gamma rays) to generate an attenuation map has several weaknesses. These methods, especially the use of CT, result in a higher radiation exposure to the patient, which can be a significant drawback due to safety concerns. Another shortcoming of the use of an additional imaging modality, such as CT, is the difficulty in registering the CT data and the SPECT data if both scans are performed in succession rather than simultaneously on a mixed modality scanner (e.g. SPECT/CT scanner). Any misalignment of the two images provides erroneous radiation attenuation information which impairs the diagnostic value of the reconstructed images. Furthermore, if both the SPECT and CT scans are performed simultaneously ("in parallel"), the need for an external transmission isotope can limit the variety of radiopharmaceuticals that can be effectively administered to the patient. Moreover, use of an external transmission source adds additional hardware with associated maintenance requirements. Finally, if a CT imaging device with diagnostic image quality is used, the data may have to be adjudged by a physician (depending upon the relevant governing law) adding time and expense to the image reconstruction process.

It is generally known that the SPECT emission data contains information from which an attenuation map could theoretically be derived without the need of an additional transmission source. Several techniques have been developed for deriving attenuation maps from emission data. Examples include: Y. Censor, D. E. Gustafson, A. Lent, and H. Tuy, "A New Approach to the Emission Computerized Topography Problem: Simultaneous Calculation of Attenuation and Activity Coefficients," IEEE Trans. Nucl. Sci., Vol. 26, pp. 2775-2779 (1979); J. Nuyts, P. Dupont, S. Stroobants, R. Benninck, L. Mortelmans, and P. Suetens, "Simultaneous Maximum a Posteriori Reconstruction of Attenuation and Activity Distribution from Emission Sinograms," IEEE Transactions On Medical Imaging, Vol. 140, pp. 393-403 (1999); F. Natterer, "Determination of Tissue Attenuation in Emission Tomography of Optically Dense Media," Inverse Problems, Vol. 9, pp. 731-736 (1993); and A. V. Bronnikov, "Reconstruction of Attenuation Maps Using Discrete Consistency Conditions," IEEE Transactions On Medical Imaging, Vol. 19, No. 5, pp. 451-462 (2000). Another method of utilizing SPECT emission data to generate an attenuation map is disclosed in U.S. Pat. No. 6,310,968 entitled "Source-Assisted Attenuation Correction for Emission Computed Tomography," the entire disclosure of which is hereby incorporated by reference. Additional iterative techniques, such as maximum likelihood expectation maximization (ML-EM) reconstruction and iterative weighted least squares/conjugate gradient (WLS/CG) reconstruction, and various other methods have also been used. Each of the aforementioned techniques are calculation-intensive and require a large amount of time and computing power to complete. Their commercial use has therefore largely been limited to two-dimensional image reconstruction. Therefore, it would be advantageous to provide a faster iterative reconstruction method requiring less time and computing power, which may find commercial use in three-dimensional image reconstruction.

According to one aspect of the present invention, a method is provided for generating an attenuation map with the use of emission data and without the need for an additional transmission measurement.

According to another aspect of the present invention, an imaging reconstruction method is provided. An attenuation map is generated with the use of emission data and without the need for an additional transmission measurement. Acquired SPECT or PET emission data are reconstructed into a SPECT or PET image using the attenuation map and an iterative reconstruction method which reconstructs the emission map and attenuation map simultaneously, based on the same data.

According to another aspect of the present invention, an imaging system and apparatus is provided for practicing the method.

One advantage resides in generating more accurate attenuation maps. Another advantage resides in more accurate SPECT, PET, or other radioemission-based imaging data reconstruction. Another advantage resides in reduced image artifacts. Yet another advantage resides in reduced patient exposure to radiation because an additional transmission scan is not necessary. Numerous additional advantages and benefits will become apparent to those of ordinary skill in the art upon reading the following detailed description of the preferred embodiments.

The invention may take form in various components and arrangements of components, and in various process operations and arrangements of process operations.

The drawings are only for the purpose of illustrating preferred embodiments and are not to be construed as limiting the invention.

FIG. 1 is an exemplary SPECT imaging system.

FIGS. 2 to 5 taken together present a flow diagram illustrating one series of steps which may be used in generating an attenuation map estimate in accordance with the present application.

Figure 6:
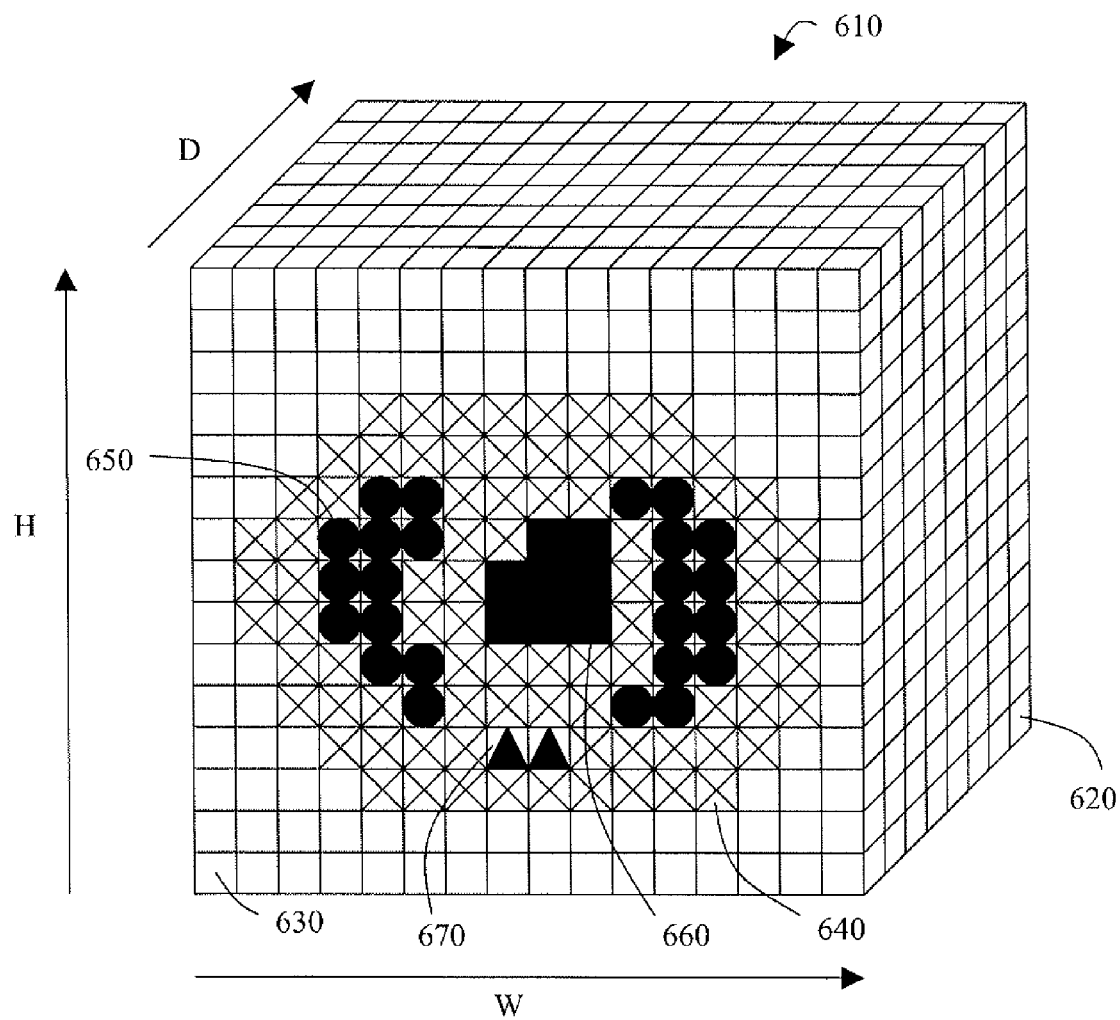

FIG. 6 is a schematic representation of a three-dimensional array of voxels in an attenuation map.

The medical diagnostic imaging system and apparatus of the present application is generally any nuclear medicine scanner that detects and records the spatial, temporal, and/or other characteristics of emitted photons, for example, a SPECT scanner or PET scanner. More specifically, with reference to FIG. 1, in an exemplary embodiment, the diagnostic nuclear imaging apparatus or scanner 100 is a SPECT imaging system. The SPECT imaging system 100 includes a subject support 110, such as a table or couch, which supports and positions a subject being examined and/or imaged, such as a phantom or patient. A stationary gantry 120 holds a rotating gantry 130 mounted thereto. The rotating gantry 130 defines a subject-receiving aperture 140. One or more detector heads 150 are mounted to the rotating gantry 130. The rotating gantry 130 and the detector heads 150 are adapted to rotate about the subject-receiving aperture 140 (and the subject when located therein).

Each of the detector heads 150 has a radiation-receiving face adapted to face the subject-receiving aperture 140 that includes a scintillation crystal, such as a large doped sodium iodide crystal, that emits a flash of light or photons in response to incident radiation. An array of photomultiplier tubes or other suitable photodetectors receives the light and converts it into electrical signals. A resolver circuit 170 resolves the x, y-coordinates of each flash of light and the energy of the incident radiation. In other words, radiation strikes the scintillation crystal causing the scintillation crystal to scintillate, i.e., emit light photons in response to the radiation. The photons are directed toward the photomultiplier tubes. Relative outputs of the photomultiplier tubes are processed and corrected to generate an output signal indicative of (i) a position coordinate on the detector head at which each radiation event is received, and (ii) an energy or "activity" of each event. The energy or activity is used to differentiate between various types of radiation such as multiple emission radiation sources, stray and secondary emission radiation, and to eliminate noise.

Optionally, the detector heads 150 include mechanical collimators 160 mounted on the radiation receiving faces of the detector heads 150. The collimators 160 preferably include an array or grid of radiation-absorbent vanes which restrict the detector heads 150 from receiving radiation not traveling along selected rays in accordance with the data type being collected (i.e., parallel beam, fan beam, and/or cone beam). In certain embodiments, the collimators 160 restrict the detector heads 150 from receiving any radiation not traveling along rays normal to the radiation receiving faces of the detector heads 150. Alternately, other collimation geometries can be employed.

In a conventional SPECT imaging study, one or more radiopharmaceutical or radioisotopes is administered to the imaged subject such that emission radiation is emitted therefrom, as discussed above. In operation, the detector heads 150 are rotated or indexed around the subject to monitor radiation from a plurality of directions. For example, the rotating gantry 130 and detector heads 150 may rotate around the imaging subject a full 360° revolution during a given study taking scans at multiple discrete locations within the 360° revolution. It should also be understood that the gantry 130 and detector heads 150 may rotate over a smaller arc or make multiple revolutions around the imaging subject as well.

Multiple two dimensional images (also called projections) are acquired at defined points during the rotation of the rotating gantry 130, typically every 3-6 degrees. The emission projection data (or measured sinogram) received by the detector heads is sorted by a resolver circuit 170 or other device, and stored in an emission memory 180 of an imaging processor 181. A SPECT reconstruction data processor 182 of the imaging processor 181 is then used to apply a reconstruction algorithm to the multiple projections to generate a SPECT image made up of image elements such as pixels (for a two-dimensional image slice or parallel array of two-dimensional image slices) or voxels (for a three-dimensional image). Such reconstruction algorithms may include, for example, filtered backprojection, an iterative reconstruction algorithm, a Fourier transform-based reconstruction algorithm, or another reconstruction algorithm. However, as previously discussed, the emission projection data generally contains inaccuracies caused by attenuation and scatter. For this reason, the following attenuation correction procedure is proposed.

Figure 2:
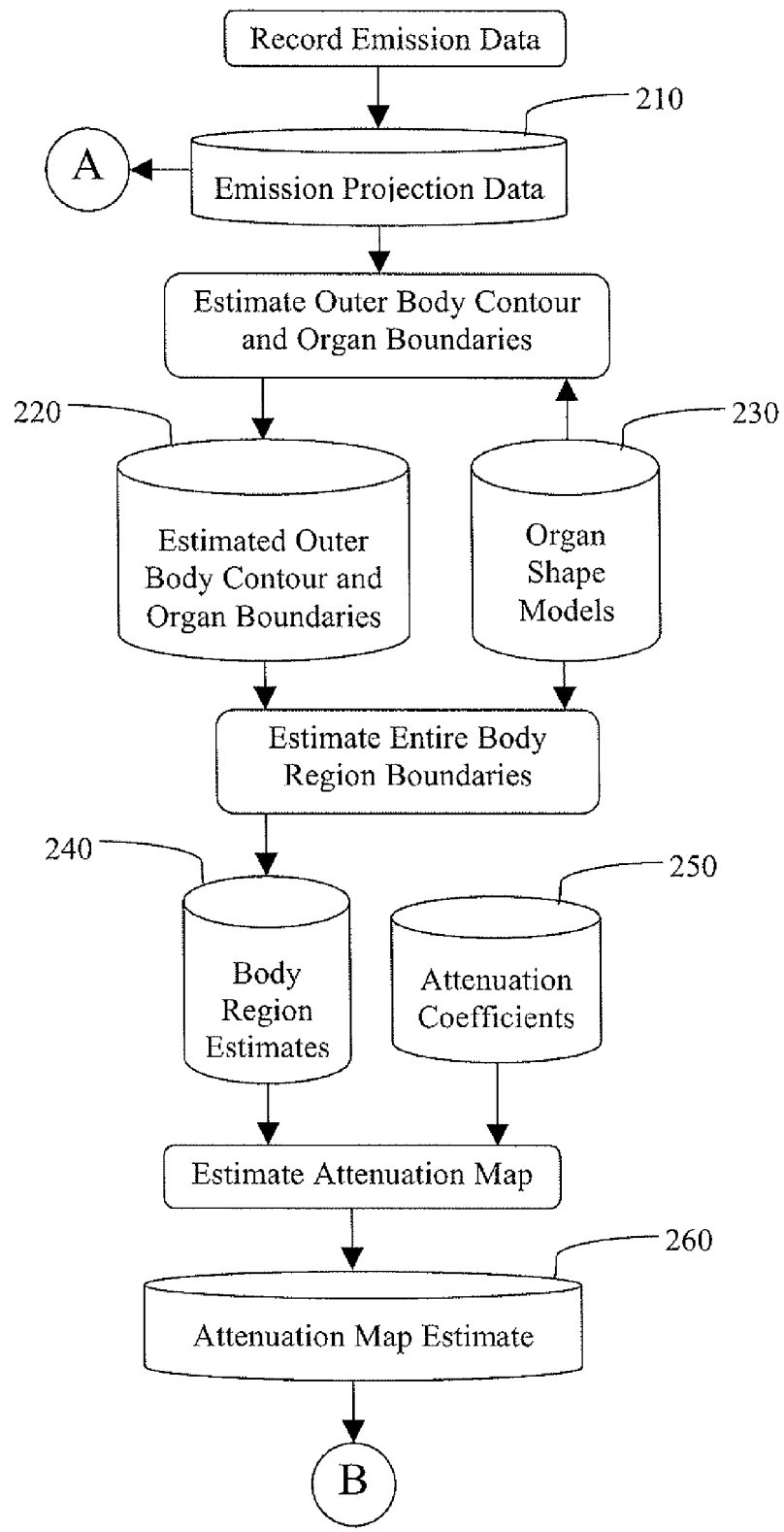

Referring now to FIG. 2, a first attenuation map estimate is generated in preparation for a first iteration of the reconstruction process. The emission projection data or measured sinogram 210 (or "A") recorded by the detector heads 150 and stored in the emission memory 180 is utilized by the data processor 182 to generate an estimate of the outer body contour of the imaged subject. Also, a known reconstruction technique, such as Ordered Subset Expectation Maximization (OSEM), is used to reconstruct the emission projection data 210. It should be understood that additional methods other than OSEM may also be used. For this initial reconstruction, a constant attenuation coefficient corresponding to soft tissue may be assumed throughout the entire body of the patient. The reconstructed SPECT image is used to refine the estimate of the outer body contour and is analyzed for areas of activity to create an estimate of the organ boundaries of the imaged subject, thus resulting in an estimate of the outer body contour and organ boundaries 220. To simplify these calculations, the estimated outer body contour may be optionally limited to convex shapes.

Organ shape models 230 obtained from organ shape databases or other catalogued sources of a priori organ knowledge (e.g., location, orientation, size and shape of organs and so forth) are used to further refine the estimated organ boundaries. Examples of such databases include prior knowledge regarding internal body structures such as the lungs, bones, intestine, heart and liver. One example of such a database is the NCAT-phantom (http://www.bme.unc.edu/~wsegars/). Some of these databases account for organ motion over time and the gender of the patient. It should be understood that the organ shape models 230 may be obtained from an external database or may be stored internally within the imaging processor 181 of the SPECT imaging system 100 in an optional reference memory 184. The estimated outer body contour and organ boundaries 220 and the organ shape models 230 are collectively analyzed to generate an estimate of the entire body regions 240 of the imaged subject in the form of a three-dimensional contour map or mesh made up of a plurality of voxels. This may involve, for example, an analysis of the spatial relationships between organs and the estimated outer body contour, the estimated location, size, orientation and shape of organs from the OSEM reconstructed image, and the a priori organ knowledge 230. In this way, each voxel of the 3D mesh is assigned to one type of several potential body regions, such as heart, liver, bone, skeletal muscle, or other issue type. If a particular patient has already been imaged, that prior data can be used to improve this estimation.

Once initially determined, the location, size and shape of these voxels in the 3D mesh are typically not thereafter varied. In other words, in some embodiments, only topology preserving adaptation of the voxels of the 3D mesh are carried out so the number of voxels remains constant (i.e., no merging or overlapping of voxels, no splitting of voxels, etc.). However, there are also "unconstrained grid" approaches based on a dynamic adaption of the local voxel structure and mesh node density during the reconstruction process. The proposed method can be adapted in alternative embodiments to support such "unconstrained grid" approaches. Each time the grid is modified according to the intermediate reconstruction result for the activity distribution, this adaption could also be applied on the structure representing the attenuation coefficient distribution. Subsequently, both unconstrained grids would match and the reconstruction method is continued as described herein.

Based on a priori knowledge, each type of body region may be assigned one attenuation coefficient to generate a collection of attenuation coefficients 250. The attenuation coefficient assigned to a particular body region represents an average attenuation which may be expected from that body particular region. For example, the "skeletal muscle" attenuation coefficient will likely be less than the "bone" attenuation coefficient, because skeletal muscles are typically less dense than bones leading to less attenuation of emission radiation. To help simplify the computations and thus reduce the time to generate useful images, each body region may be assigned one single attenuation coefficient. In that case, once a particular voxel in the 3D mesh is assigned to a particular body region, the attenuation coefficient for that voxel is automatically determined. For example, each of the voxels in the body region estimate 240 estimated to correspond to bones is assigned the same "bone" attenuation coefficient, each of the voxels in the body region estimate 240 estimated to correspond to a lung is assigned the same "lung" attenuation coefficient, and so on. Every distinct body region is thereby homogenously assigned one attenuation value.

However, in alternative embodiments, each body region may be assigned an attenuation coefficient that is selected from a range of attenuation coefficients that correspond to that body region. For example, each of the voxels in the body region estimate 240 that are estimated to correspond to bones may be assigned an attenuation coefficient selected from a range of predetermined "bone" attenuation coefficients based upon certain characteristics of the particular voxel, such as the location of the voxel relative to the outer body contour, the location of the voxel relative to the estimated bone boundaries, etc. In this instance, once a particular voxel in the 3D mesh is assigned to a particular body region, an additional selection process is carried out to select an attenuation Coefficient for that voxel from a range of attenuation coefficients for that particular body region.

Once each of the voxels of the body region estimate 240 is assigned an attenuation coefficient, this information is compiled to create a three-dimensional attenuation map estimate or µ map 260 (or "B"). In one embodiment, this attenuation map estimate 260 is stored internally in the imaging processor 181 of the SPECT imaging device 100 in an attenuation memory 186. Generally, the number of voxels in the attenuation map estimate 260 is determined based upon the number of voxels (or granularity) of the particular emission map being used in the reconstruction. The attenuation map estimate 260 may have an identical number of voxels as the emission map in some embodiments (e.g., the attenuation map may be a 128 voxel by 128 voxel map and the emission map may be a 128 voxel by 128 voxel map). Alternatively, the attenuation map estimate 260 may have a different number of voxels than the emission map. In that case, the attenuation map estimate 260 typically has less granularity than the emission map by a factor of two (e.g., if the emission map is a 128 voxel by 128 voxel map, a 64 voxel by 64 voxel attenuation map estimate is generated) to allow for efficient registration of the attenuation map estimate 260 with the emission map.

The attenuation coefficients 250 discussed above may be obtained from various sources. As already discussed, in one embodiment the attenuation coefficients 250 may be in the form of a database including one attenuation coefficient for each body region designation (i.e., heart, lung, other organ, muscle, bone, or other tissue type) or a database including a range of attenuation coefficients for each body region designation. In additional embodiments, the attenuation coefficients 250 may be customized to allow them to be more accurately tailored to the particular imaged subject. To provide for this customization, the attenuation coefficients 250 may be chosen based upon various characteristics of the imaged subject (i.e., age, size, weight, gender, etc.). Appropriate attenuation coefficients 250 for a given imaged subject may then be selected from this collection based upon the characteristics of the imaged subject. Preferably, however, for a particular imaged subject only a single attenuation coefficient or range of coefficients is chosen for each body region. As with the organ shape models 230, the attenuation coefficients 250 may be obtained from an external database or may be stored internally within the SPECT imaging system 100 in an optional reference memory 184.

Figure 3:
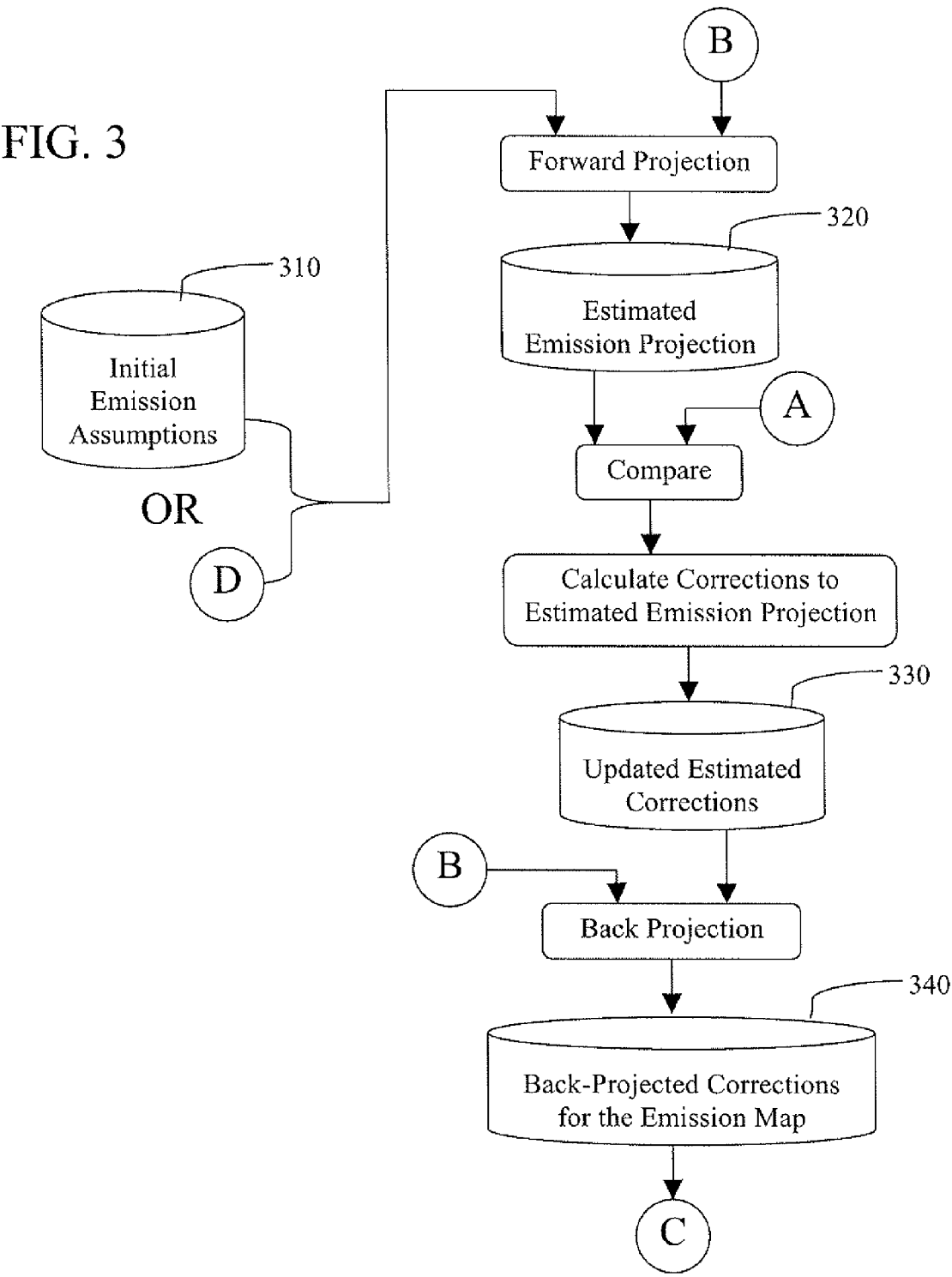
Figure 5:
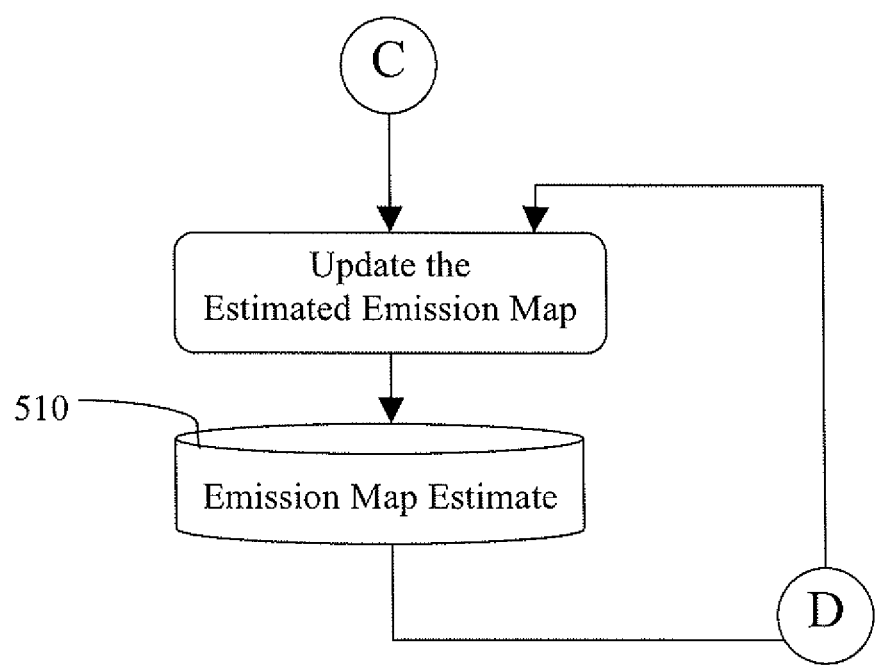

Referring now to FIG. 3, an initial emission assumption 310 is obtained from the OSEM reconstruction discussed above or another reconstruction method (and is optionally stored in an internal image memory 190). The initial emission assumption 310 and the attenuation map estimate "B" simultaneously undergo an iterative reconstruction. Data processor 182 is utilized to apply a forward projection algorithm to the initial emission assumption 310 and the attenuation map estimate "B" to obtain an estimated emission projection 320. This estimated emission projection 320 is then compared with the measured emission projection data "A." Necessary corrections to the estimated emission projection data 320 are then carried out based upon this comparison to obtain updated estimated corrections 330. For example, the corrections may be computed similarly to the backprojection-step of the standard ML-EM/OS-EM algorithm. The correction is then performed as a point-wise division of the measured and estimated sinogram data. The updated estimated corrections 330 are then back projected along with attenuation map estimate "B" to obtain back projected corrections for the emission map 340 (or "C"). As shown in FIG. 5, these back-projected corrections 340 are applied for example using a point-wise multiplication with the estimated emission map, to obtain an updated estimated emission map 510. The ML-EM/OS-EM algorithm shown here may be used:

$$\lambda^{(n+1)} = \lambda^{(n)} \overbrace{\dfrac{1}{\sum_{j \in J} f_{ij}^{\mu}} \sum_{j \in J} f_{ij}^{\mu} \cdot \underbrace{\left[ \dfrac{p_j}{\underbrace{\sum_{i \in I} f_{ij}^{\mu} \lambda_i^{(n)}}_{\text{forward projector}}} \right]}_{\text{corrections for the emission map}}}^{\text{update step}}$$

Figure 4:
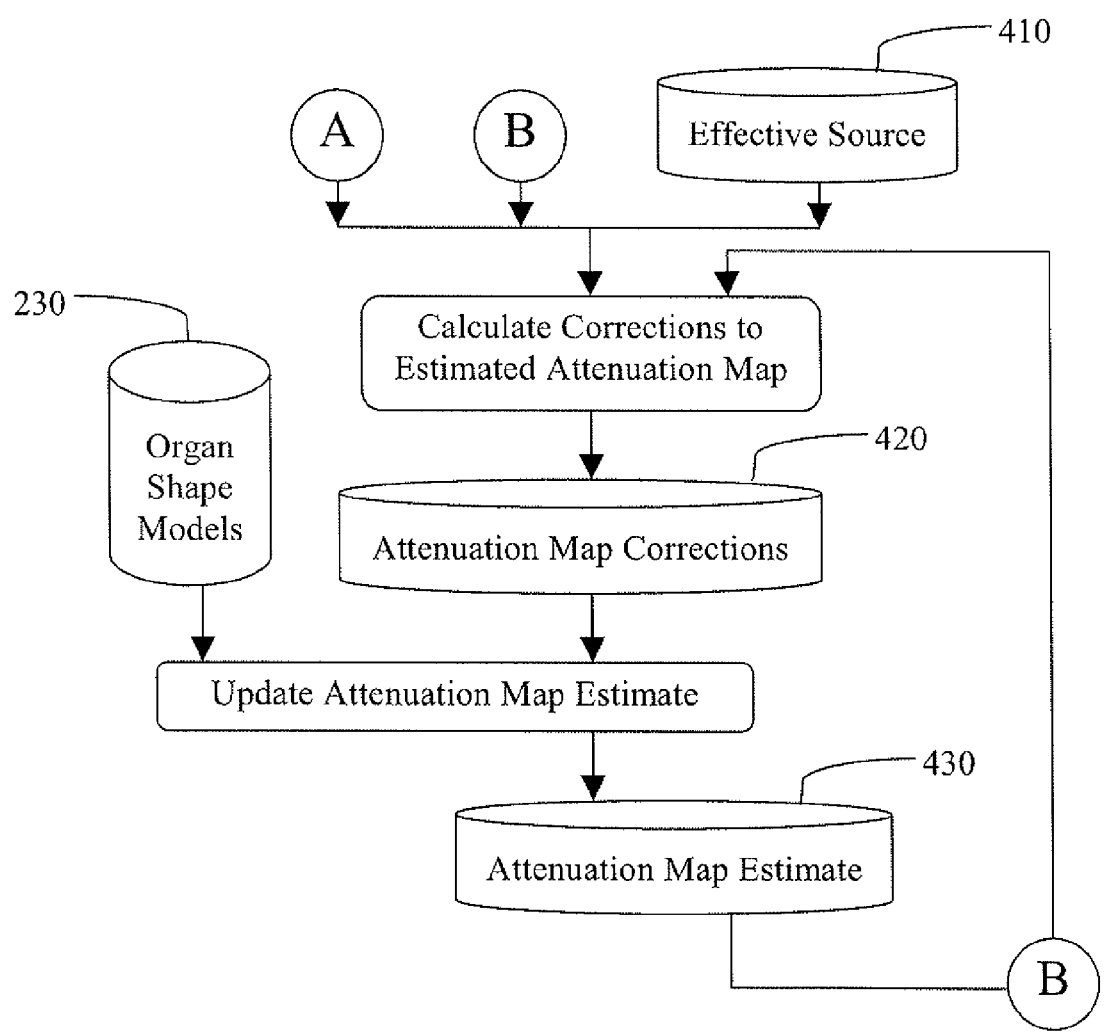

Referring now to FIG. 4, an updated attenuation map estimate is generated. First, the emission projection data "A", the initial attenuation map estimate "B," and optionally effective source information 410 are collectively analyzed and compared to generate attenuation map corrections 420. Effective source information is one known method of modeling for scatter. In one embodiment, effective source information 410 is calculated during the forward projection of the emission assumption 310 and the attenuation map estimate "B." In various embodiments, the attenuation map corrections 420 are obtained using a variety of algorithms. For example the following algorithm may be utilized:

$$K_i^\mu = \dfrac{1}{\sum_{j \in J} b_{ij}} \sum_{j \in J} \underbrace{\left[ \left(1 - \dfrac{p_j}{\sum_{i \in I} f_{ij}^{\mu^{(n)}} \lambda_i^{(n)}} \right) \cdot b_{ij} \right]}_{\text{relative Error Sinogram}}$$

where $$b_{ij} = \sum_{\hat{i} \in I_{ij}^*} \underbrace{f_{ij}^{\mu^{(n)}} \lambda_i^{(n)}}_{\text{Effective Source}},$$

$$I_{ij}^* = \{I \mid u_i^j > u_i^j; \hat{i} \in I\}$$

and

J: Index space of all detector bin positions in the detector head 150, j ∈ J
I: Index space of all voxels inside the 3D mesh, i ∈ I
$p_j$: measured emission projection data "A" entry at detector bin j
$\lambda_i$: activity value at voxel i
$\mu^{(n)}$: attenuation map after n iterations
$f_{ij}^\mu$: Attenuated projection weight of voxel i to detector bin j
$u_i^j$: geometrical distance from voxel i to detector bin j
$K_i^\mu$: Correction value of voxel I ($K_i \in R$)

In alternate embodiments, the following algorithm may be used to account for multiple/isotope nuclide measurements and scatter:

$$K_i^{\mu_0^{(n)}} = \dfrac{1}{\sum_{w \in W} \sum_{j \in J} b_{ij}^{w,(n)}} \sum_{w \in W} \left\{ \sigma_w c_w \sum_{j \in J} \underbrace{\left[ \left(1 - \dfrac{p_j^w}{\sum_{i \in I} ES_{ij}^{w,(n)}} \right) \cdot b_{ij}^{w,(n)} \right]}_{\text{normalized Error Sinogram}} \right\}$$

with $$b_{ij}^{w,(n)} = \sum_{\hat{i} \in I_{ij}^*} ES_{ij}^{w,(n)},$$

$$I_{ij}^* = \{I \mid u_i^j > u_i^j; \hat{i} \in I\},$$

$$ES_{ij}^{w,(n)} = \sum_{s \in S} \underbrace{f_{ij}^{sw,\mu_w^{(n)}} \lambda_i^{s(n)}}_{\text{Effective Source}}$$

and

S: Index space of distributed isotopes
W: Index space of measured energy windows, w ∈ W
J: Index space of all detector bin positions, j ∈ J
I: Index space of all voxels inside the reconstruction volume, i ∈ I
$p_j^w$: measured data sinogram entry at detector bin j in energy window w
$\lambda_i$: activity value at voxel i
$\mu^{(n)}$: attenuation map after n iterations
$f_{ij}^\mu$: Attenuated projection weight of voxel i to detector bin j
$u_i^j$: geometrical distance from voxel i to detector bin j
$K_i^\mu$: Correction value of voxel I ($K_i \in R$), local attenuation coefficient should be raised if $K_i > 0$ or lowered if $K_i < 0$
$\sigma_w$: value equal to 1 if $p^w$ contains unscattered data, else value equal to −1

$c_w$: weighting coefficient depending on energy window and thus the total cross sections The attenuation map corrections 420 are then utilized to generate an updated attenuation map estimate 430 corresponding to an updated body region as described above. In this way, a given voxel initially estimated to be a "heart" voxel (with an associated attenuation coefficient) may become a "lung" voxel (with a different associated attenuation coefficient), and so forth.

Referring now to FIG. 5, an updated emission map estimate is generated. First, back-projected corrections "C" (see FIG. 3) are used to update the emission map 510. For example, in ML-EM/OS-EM this step is performed by a point-wise multiplication between "C" and the estimated emission map "D," as described above. Thus, an updated emission map estimate 510 or "D" is generated.

Referring again to FIG. 3, the simultaneous iterative reconstruction of the estimated emission map and estimated attenuation map is continued. For each iteration of the reconstruction process, the updated emission map estimate "D" (from FIG. 5) is forward projected along with the updated attenuation map "B" (from FIG. 4) to generate a new estimated emission projection 320. As discussed earlier, the updated estimated emission projection 320 is then compared with the measured emission projection data "A." Necessary corrections to the estimated emission projection data "A" are then completed based on this comparison to obtain new updated estimated corrections 330. The updated estimated corrections 330 are then used along with attenuation map estimate "B" to obtain a new back-projected corrections "C," and the process continues as already described.

FIG. 6 is a schematic representation of a three-dimensional array 610 of voxels 620 for generating an attenuation map. The representative array 610 has 16 voxels along a width axis W, 16 voxels along a height axis H, and 8 voxels along a depth axis D. The size of array 610 is chosen for ease of illustration only. For example, as already stated, in actual use there may be 64, 128, or more or less voxels 620 along the width axis W and the height axis H. The voxels in the front-most 16 by 16 array shown in FIG. 6 are marked to identify the body regions of an imaged patient, according to the following key: an empty voxel 630 corresponds to space around the imaged patient, a voxel with an "X" 640 corresponds to soft tissue of the imaged patient, a voxel with a filled-in circle 650 corresponds to the lungs of the imaged patient, a completely filled-in voxel 660 corresponds to the heart of the imaged patient, and a voxel with a filled-in triangle 670 corresponds to the spine of the imaged patient. Thus, the depth axis D in FIG. 6 corresponds to the longitudinal axis of the imaged patient. The remaining voxels behind the front-most array along the depth axis D of the array 610 will have similar configurations which, taken together, roughly define the borders of the imaged patient's body, lungs, heart, spine or other body region type(s) in the imaged area. As the iterative process described above is performed, the assigned body regions will likely change; for example, a particular lung voxel may become a soft body voxel, or vice versa, as the accuracy of the attenuation map increases.

To simplify the iterative process, and reduce the computing time, the attenuation map processing may be limited to the boundary area between estimated body regions. This reduces the regions of interest to multiple series of linked or chained voxels defining the outer contours of these regions, reducing the issue from a two-dimensional calculation to a one-dimensional calculation.

The simultaneous iterative reconstruction of the estimated emission map and estimated attenuation map is continued until a threshold level of convergence between the measured emission projection data "A" and the estimated emission map "D" is satisfied. This may be calculated as either an acceptably low error between "A" and "D," or a minimum consistency between "A" and "D." This threshold level of convergence may vary from image study to image study.

Upon completion of the final iteration, the final back-projected emission map "D" is then formatted by the image processor 192 into an image representation of the imaged subject for viewing on a display device 194, such as a video monitor or other suitable device. Also, the final estimated attenuation map "B" may be viewed and modified by a clinician as an additional quality control step.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various components and arrangements of components, and in various steps and arrangements of steps. The drawings are only for purposes of illustrating the preferred embodiments and are not to be construed as limiting the invention.

Having thus described the preferred embodiments, the invention is now claimed to be:

1. A method of generating an attenuation map estimate for use in attenuation correction with an image reconstruction of emission projection data of an imaged subject using of a medical diagnostic imaging apparatus, the method comprising:
   generating, by an imaging processor, an outer body contour estimate of the imaged subject based on the emission projection data;
   generating, by the imaging processor, an organ boundary estimate of the imaged subject based on the emission projection data;
   generating, by the imaging processor, a three-dimensional body region estimate of the imaged subject based upon the outer body contour estimate and the organ boundary estimate, wherein the body region estimate is made up of a plurality of voxels, each voxel being assigned one of a plurality of body region indicators;
   assigning, by the imaging processor, each voxel of the body region estimate an attenuation coefficient based upon the body region indicator of that voxel, wherein the same attenuation coefficient is assigned to each voxel with the same body region indicator or wherein the attenuation coefficient assigned to each voxel is selected from a range of predetermined attenuation coefficients, wherein the range of predetermined attenuation coefficients corresponds to the body region indicator of the voxel;
   generating, by the imaging processor, an attenuation map estimate based on the assigned attenuation coefficients;
   iteratively updating, by the imaging processor, the attenuation map estimate during a reconstruction of the emission projection data;
   generating, by the imaging processor, a reconstructed image of the imaged subject based on the updated attenuation map; and
   displaying, by a display device, the reconstructed image of the imaged subject.

2. The method of claim 1, wherein the step of generating an organ boundary estimate comprises the step of analyzing a reconstructed image of the emission projection data for areas of activity.

3. The method of claim 2, wherein the step of generating a three-dimensional body region estimate further comprises the step of refining the organ boundary estimate by analyzing a priori organ knowledge.

4. The method of claim 1, wherein the same attenuation coefficient is assigned to each voxel with the same body region indicator.

5. The method of claim 1, wherein the attenuation coefficient assigned to each voxel is selected from a range of predetermined attenuation coefficients, wherein the range of predetermined attenuation coefficients corresponds to the body region indicator of the voxel.

6. The method of claim 1, wherein the attenuation coefficient assigned to each voxel is selected based upon at least one physical characteristic of the imaged subject.

7. The method of claim 1, wherein the attenuation map is generated for use in attenuation correction with a SPECT image reconstruction or a PET image reconstruction.

8. The method of claim 1, wherein the step of generating a three-dimensional body region estimate further comprises the step of refining the organ boundary estimate by analyzing a priori organ knowledge.

9. The method of claim 8, wherein the step of generating a three-dimensional body region estimate further comprises the step of refining the organ boundary estimate by spatially relating the organ boundary estimate with the outer body contour estimate.

10. The method of claim 1, further comprising:
collecting the emission projection data;
generating, by the imaging processor, the emission map estimate from a reconstruction of the collected emission projection data; and
iteratively reconstructing, by the imaging processor, the emission map estimate.

11. The method of claim 10, further comprising simultaneous iterative reconstruction of the emission map estimate and iterative updating of the attenuation map estimate.

12. The method of claim 11, wherein each iteration of the step of iteratively reconstructing the emission map estimate and iteratively updating the attenuation map estimate comprises:
forward projecting, by the imaging processor, the emission map estimate and the attenuation map estimate to generate an estimated emission projection;
comparing, by the imaging processor, the estimated emission projection with the emission projection data to generate estimated emission projection corrections;
back projecting, by the imaging processor, the estimated emission projection corrections and the attenuation map estimate to generate back-projected emission projection corrections; and
generating, by the imaging processor, an updated attenuation map estimate by analyzing the emission projection data, the attenuation map estimate and effective source information to calculate corrections for the attenuation map estimate.

13. The method of claim 10, wherein the step of generating an organ boundary estimate comprises the step of analyzing a reconstructed image of the emission projection data for areas of activity.

14. The method of claim 13, wherein the step of generating a three-dimensional body region estimate further comprises the step of refining the organ boundary estimate by analyzing a priori organ knowledge.

15. The method of claim 10, wherein each body region indicator corresponds to a single attenuation coefficient.

16. The method of claim 10, wherein the attenuation coefficient assigned to each voxel is selected from a range of predetermined attenuation coefficients corresponding to the body region indicator of the voxel.

17. The method of claim 10, wherein the attenuation coefficient assigned to each voxel is selected based upon at least one physical characteristic of the imaged subject.

18. The method of claim 10, wherein the medical diagnostic imaging apparatus comprises a SPECT imaging apparatus or a PET imaging apparatus.

19. The method of claim 10, wherein the step of generating a three-dimensional body region estimate further comprises the step of refining the organ boundary estimate by analyzing a priori organ knowledge.

20. The method of claim 19, wherein the step of generating a three-dimensional body region estimate further comprises the step of refining the organ boundary estimate by spatially relating the organ boundary estimate with the outer body contour estimate.

21. A medical diagnostic imaging apparatus, comprising:
an emission memory configured to store emission projection data;
an image memory configured to store an emission map estimate generated from a reconstruction of the emission projection data;
an attenuation memory configured to store an attenuation map estimate;
a reconstruction data processor configured to iteratively reconstruct the emission map estimate and iteratively update the attenuation map estimate to obtain a final emission map, comprising logic that instructs the reconstruction data processor to:
generate an outer body contour estimate of an imaged subject based on the emission projection data;
generate an organ boundary estimate of the imaged subject based on the emission projection data;
generate a three-dimensional body region estimate of the imaged subject based upon the outer body contour estimate and the organ boundary estimate, wherein the body region estimate is made up of a plurality of voxels, each voxel being assigned one of a plurality of body region indicators;
assign each voxel of the body region estimate an attenuation coefficient based upon the body region indicator of that voxel, wherein the same attenuation coefficient is assigned to each voxel with the same body region indicator or wherein the attenuation coefficient assigned to each voxel is selected from a range of predetermined attenuation coefficients, wherein the range of predetermined attenuation coefficients corresponds to the body region indicator of the voxel;
generate the attenuation map estimate based on the assigned attenuation coefficients;
iteratively reconstruct the emission projection data using the attenuation map estimate to generate the emission map estimate;
iteratively update the attenuation map estimate during the reconstruction of the emission projection data; and
generate a reconstructed image of the imaged subject based on a final emission map; and a display device configured to render the reconstructed image of the imaged subject.

22. The apparatus of claim 21, wherein the medical diagnostic imaging apparatus comprises a SPECT imaging apparatus or a PET imaging apparatus.

23. The apparatus of claim 21, further comprising a reference memory for storing a priori organ knowledge.

24. The apparatus of claim 21, further comprising a reference memory for storing a grouping of attenuation coefficients.

* * * * *